United States Patent [19]

Juso

[11] Patent Number: 4,719,521
[45] Date of Patent: Jan. 12, 1988

[54] PCM RECORDING AND REPRODUCING APPARATUS

[75] Inventor: Hiromi Juso, Gose, Japan

[73] Assignee: Sharp Kabushiki Kaisha, Osaka, Japan

[21] Appl. No.: 740,532

[22] Filed: Jun. 3, 1985

[51] Int. Cl.$^4$ .................... G11B 5/00; G11B 15/46
[52] U.S. Cl. ................................. 360/32; 360/73
[58] Field of Search .................. 360/32, 73, 28, 27

[56] References Cited

U.S. PATENT DOCUMENTS 4,389,681  6/1983  Tanaka et al. .................... 360/27
4,590,522  5/1986  Takemoto et al. ................ 360/32

Primary Examiner—Vincent P. Canney
Attorney, Agent, or Firm—Birch, Stewart, Kolasch & Birch

[57] ABSTRACT

A PCM recording and reproducing apparatus record digital signals obtained by sampling and quantizing analog signals on a recording medium after adding control words, synchronizing signals, etc. to the digital signals. The PCM recording and reproducing apparatus includes means for setting sampling frequencies, means for controlling the speed of recording the signals on said recording medium so as to comply with the set sampling frequency, means for generating sampling frequency indicating codes, and means for adding the sampling frequency indicating codes to the digital signals. Accordingly, sound signals can be recorded and reproduced at various sampling frequencies by the recording and reproducing apparatus of the present invention.

7 Claims, 4 Drawing Figures

PCM RECORDING AND REPRODUCING APPARATUS

BACKGROUND OF THE INVENTION

The present invention relates to a PCM (Pluse Coded Modulation) recording and reproducing apparatus for recording on and reproducing from a recording medium such as a magnetic tape, analog signals such as sound signals converted into digital signals.

Generally, in recording sound signals in form of digital signals in this type of a recording and reproducing apparatus, analog sound signals are first sampled with an optional sampling frequency Fs.

The sampling frequency Fs is determined on the basis of the reproducing frequency band. Theoretically, the sampling frequency Fs must be twice or more as high as the reproducing frequency band.

A higher sampling frequency is preferable in view of the reproduced sound quality, because the reproducing band width increases with the sampling frequency. On the other hand, however, the amount of data to be recorded also increases with the sampling frequency, and therefore, recording becomes more difficult as the sampling frequency increases.

In the conventional PCM recording and reproducing apparatus, the sampling frequency Fs for sound signals is, for example, 32 KHz, 44.1 KHz, 48 KHz, 50 KHz, 50.4 KHz etc. The sampling frequency Fs for the recording and reproducing apparatus must be set appropriately, taking into consideration the recording capacity of the recording and reproducing apparatus itself and the sampling frequencies of other equipment.

When a souce recorded digitally at a certain sampling frequency is to be input for recording in a digital form in a recorder of a different sampling frequency, the source must be subjected to D/A conversion to adjust the sampling frequency or the sampling frequency Fs must be changed by a frequency converter.

If a source recorded at a higher sampling frequency Fs is input to be recorded in a recorder of a lower sampling frequency, the sound quality will be deteriorated. Inversely, if a source recorded at a lower sampling frequency is input for recording in a recorder of a higher sampling frequency, the recording capacity of the recorder will not be effectively used. Accordingly, an ideal recording device should be capable of recording and reproducing a source at the same sampling frequency as that of the source, whatever the frequency it may have.

Various types of PCM recording and reproducing apparatus have been developed. Any of these types has a particular sampling frequency and therefore exhibits a number of problems in recording a digital source with another sampling frequency, though it has no problem in recording analog signals.

SUMMARY OF THE INVENTION

It is accordingly the object of the present invention to provide a PCM (Pulse Coded Modulation) signal recording and reproducing system which enables recording or reproduction to be conducted at various sampling frequencies by changing the tape speed.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

To attain the above object, in a PCM recording and reproducing apparatus according to an embodiment of the present invention, digital signals obtained by sampling and quantizing analog signals are added with control words, synchronizing signals, etc. in a signal processing circuit. These digital signals are then recorded in a recording medium. The PCm recording and reproducing apparatus comprises means for setting sample frequencies, means for controlling the speed of recording the signals in said recording medium according to the set sampling frequency, means for generating codes indicating the set sampling frequency and means for adding the sampling frequency-indicating codes to said digital signals.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE INVENTION

Figure 1:
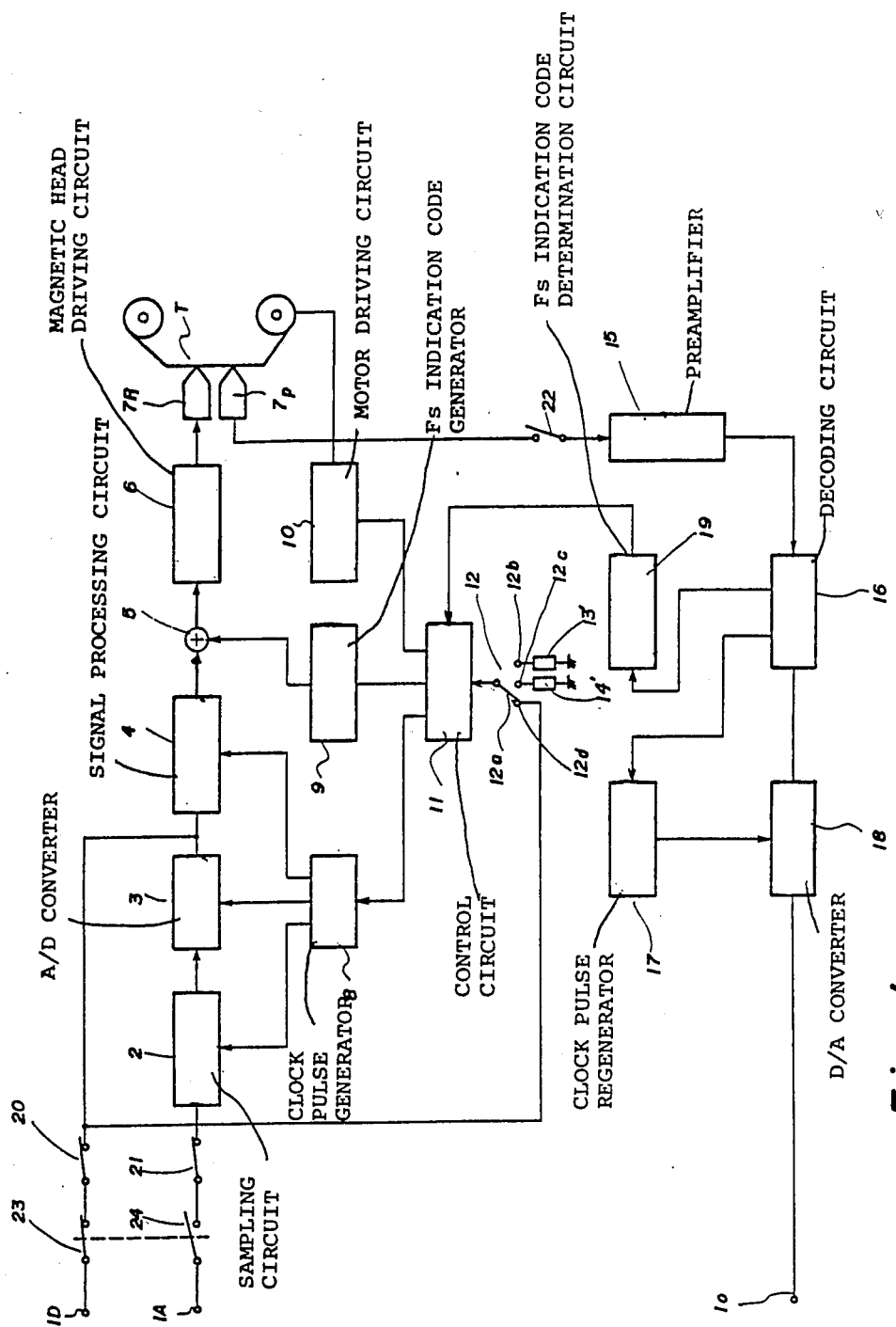
FIG. 1 is an electric circuit block diagram of an embodiment of the present invention.

Referring to FIG. 1 which shows the electric circuit of the recording and reproducing apparatus according to the present invention, 1A is an input terminal for analog sound signals that have not been pulse-code-modulated (hereinafter called analog signals), 1D is an input terminal for PCM digital sound signals (hereinafter called digital signals), and 10 is an output terminal of a reproducing system.

The analog signals are sampled in a sampling circuit 2 with a clock frequency (or sampling frequency hereinafter represented by Fs; 48 KHz and 32 KHz are used here) supplied from a clock pulse generator 8. The sampled analog signals from the sampling circuit 2 are then sent to an A/D converter 3 where the analog signals are quantized or converted to 16-bit digital signals. The digital signals are rearranged and added with error correction codes and other necessary codes in a signal processing circuit 4 whose construction is already known.

In addition to the digital signals from said A/D converter 3, the signal processing circuit 4 also receives digital signals from the input terminal 1D (digital signals from radio broadcastings or from compact disc (CD) players).

Both of said A/D converter 3 and said signal processing circuit 4 carry out their functions in accordance with clock pulses from said clock pulse generator 8.

The digital data are then transferred from the signal processing circuit 4 to an Fs indication code adding circuit 5 (composed of a multiplexer) where an Fs indication code (the logical value which is "0" for Fs at 48 KHz or "1" for Fs at 32 KHz) supplied from an Fs indication code generator 9 is added to the digital data.

Figure 2:
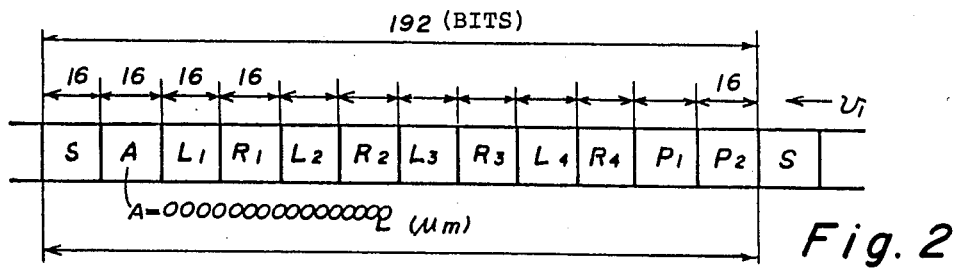
FIG. 2 show the patterns of the digital signals in one frame, recorded at the sampling frequency of 48 KHz.

FIG. 2 shows an example of one digital signal alignment track recorded on a tape by the recording and reproducing apparatus of the present invention. In this example, a frame consisting of 192 bits is repeatedly recorded on the tape. A synchronizing signal S having a specified pattern comes at the front, followed by a control word A, audio data words $L_1 \sim R_4$ and error correcting words $P_1$ and $P_2$. Each one of these words consists of 16 bits.

Figure 3:
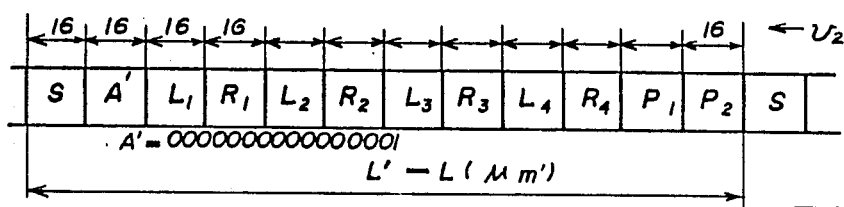
FIG. 3 shows the patterns of the digital signals in another frame, recorded at the sampling frequency of 32 KHz.

In the Fs indication code adding circuit 5, the Fs indication code is applied to the end of the final bit of the control word A; "0" is added for Fs at 48 KHz as shown in FIG. 2 or "1" is added to the end of the final bit of the control word A' for Fs at 32 KHz as shown in FIG. 3.

The digital signals with Fs indication codes are supplied to a magnetic head driving circuit 6 and recorded through a recording head 7R on a magnetic tape T.

The magnetic tape T is driven by a motor (not shown) which is actuated by a motor driving circuit 10. The motor driving circuit 10 is controlled by a speed control signal supplied from a control circuit 11 so as to select a motor speed that permits the magnetic tape T to run at a rate suitable to the sampling frequency.

Now, the relationship between the magnetic tape running speed and Fs will be specified below. As shown in FIGS. 2 and 3, there are eight audio data words $L_1$, $R_1 \ldots L_4$, $R_4$, four for each of the left and the right channels. Since the time required for recording on the magnetic tape T mainly depends upon these audio data words, the recording time $t_1$ for one frame at 48 KHz (represented as $Fs_1$) is expressed by the equation:

$$t_1 = 4 \times 1/Fs_1$$

Accordingly, the relationship between the running speed $V_1$ of the magnetic tape T and the recorded length L of one frame is expressed by the equation:

$$L = V_1 t_1 = \frac{4V_1}{Fs_1}$$

Similarly, the relationship between the running speed $V_2$ of the magnetic tape T and the recorded length L' of one frame when Fs is 32 KHz (represented as $Fs_2$) is expressed by the equation:

$$L' = \frac{4V_2}{Fs_2}$$

Therefore, if $V_2/V_1 = Fs_2/Fs_1 = \frac{2}{3}$, then $L' = L$. That is, the digital signal pattern recorded at 32 KHz on the magnetic tape is completely the same as that recorded at 48 KHz, as shown in FIG. 3.

The control circuit 11 has three functions: the function for supplying the motor driving circuit 10 with a speed control signal for the tape running speed $V_1$ or $V_2$ depending upon the selected Fs, the function to allow the Fs indication code generator 9 to output Fs indication code in accordance with the selected Fs, and the function to allow the clock pulse generator 8 to output clock pulses with a frequency suitable to the selected Fs.

The reference number 12 denotes a manual switch composed of a movable terminal 12a and three stationary terminals 12b, 12c and 12d to be selected by the movable terminal 12a, the stationary terminals 12b and 12c being connected with quartz oscillator 13 and 14 which generate 48 KHz and 32 KHz respectively, the stationary terminal 12d receiving Fs from other source through the input terminal 1D.

The control circuit 11 conducts three functions as mentioned above according to the frequency obtained from either one of the terminals 12b and 12c selected by the movable terminal 12a.

7p is a reproducing head, 15 is a preamplifier and 16 is a decoding circuit where digital signals transmitted from the preamplifier 15 are regenerated and errors are corrected. 17 is a regenerator for regenerating clock pulses from the signals regenerated in the decoding circuit 16 and for supplying the same to a D/A converter 18 which converts the digital signals regenerated in the decoding circuit 16 to analog signals in accordance with the clock pulse (equivalent to Fs) obtained from the clock pulse regenerator 17, and then outputs the analog signals through the output terminal 10.

The reference number 19 denotes an Fs indication code determination circuit which determines the Fs indication code by the last bit of the control word A or A' in the signal regenerated in the decoding circuit 16 and accordingly outputs a signal to the control circuit 11. The control circuit 11 generates a speed control signal for the speed $V_1$ or $V_2$ of the magnetic tape T, according to the Fs indication code determined by the Fs indication code determination circuit 19.

The recording mode or the reproducing mode is selected by mode select switches 20, 21 and 22 which operate interlocking with one another.

The numerals 23 and 24 are D/A select switches for selecting the line for digital signals or for analog signals depending upon the signal input in the recording mode.

In the construction mentioned above of the present invention, the input terminals 1D and 1A and the components 2 through 14 comprise the recording system, and the reproducing head 7p and the components 15 through 19 comprise the reproducing system.

Operation of the invention

Recording mode:

The mode select switches 20 and 21 are ON and the mode select switch 22 is OFF in the recording mode.

If analog signals are to be introduced through the input terminal 1A the D/A select switch 23 is turned OFF and the switch 24 is turned ON, and desired sampling frequency Fs is selected by the manual switch 12.

For example, when signals are to be recorded at 48 KHz, position the movable terminal 12a of the manual switch 12 at the stationary terminal 12b. Then, a frequency generated by the quartz oscillator 13 is supplied through the manual switch 12 to the control circuit 11. According to the frequency thus supplied, the control circuit 11 judges that Fs should be set at 48 KHz, and controls the clock pulse generator 8 to output 48 KHz Fs, the Fs indication code generator to output the Fs indication code "0" for indicating that the sampling frequency is 48 KHz, and the motor driving circuit 10 to output the speed control signal for setting the speed of the magnetic tape T at $V_1$.

Thus, the recording mode with Fs at 48 KHz has been set. When analog signals are introduced from the input terminal 1A in the recording mode with above setting, the signals are transmitted through the D/A select switch 24 and the mode select switch 21 to the sampling circuit 2 where the signals are sampled sequentially at 48 KHz.

The analog signals are then successively converted or quantized into 16 bit digital signals (audio data) in the following A/D converter 3 and supplied to the signal processing circuit 4 which adds a synchronizing signal S, a control word A and error correcting words $P_1$ and $P_2$ to each of the digital signals each consisting of audio data for four samples, input from the A/D converter 3, and rearranges the alignment so as to successively output the digital signals for one frame with the pattern as shown in FIG. 2.

The digital signals are then supplied to the following Fs indication code adding circuit 5 where the Fs indication code "0" indicating 48 KHz is added to the last bit of the control word A of each of the digital signals, and is introduced through the magnetic head driving circuit 6 to the recording head 7p so that the digital signals are recorded on the magnetic tape T which is running at a rate of $V_1$.

The operation for each component in recording analog signals has been described above.

If digital signals are to be introduced through the input terminal 1D for being recorded on the magnetic tape T, the D/A select switch 23 is turned ON, the switch 24 turned OFF, and the movable terminal 12a of the manual switch 12 is positioned at the stationary terminal 12d.

Then, the digital signals are transmitted through the D/A select switch 23 and the mode select switch 20 to the signal processing circuit 4 as well as to the manual switch 12 through which the signals are input into the control circuit 11.

The control circuit 11 detects the sampling frequency of the digital signal input and accordingly controls the Fs indication code generator 9 and the motor driving circuit 10. More specifically, when the detected Fs is 48 KHz, the control circuit 11 makes the Fs indication code generator 9 output the Fs indication code "0" and sends a 48 KHz-equivalent speed control signal to the motor driving circuit 10 so that the magnetic tape T runs at the speed $V_1$.

Similarly with analog signals, the digital signals are added with a synchronizing signal S, a control word A and error correcting words $P_1$ and $P_2$ in the signal processing circuit 4 to have the pattern as shown in FIG. 2. The digital signals are then added with the Fs indication code "0" at the last bit of the control word in the following Fs indication code adding circuit 5 and supplied to the magnetic head driving circuit 6.

Thus, the digital signals are recorded through the recording head 7R on the magnetic tape T which is running at the speed of $V_1$.

The above operation is for the sampling frequency at 48 KHz. The digital signals with 32 KHz Fs can also be recorded on the magnetic tape T by the similar operation.

For analog signals with 32 KHz Fs, the movable terminal 12a of the manual switch 12 is positioned at the stationary terminal 12c so that the control circuit 11 controls the motor driving circuit 10, the Fs indication code generator 9 and the clock pulse generator 8 in accordance with the frequency generated by the quartz oscillator 14. That is, the control circuit 11 controls the motor driving circuit 10 to effect the magnetic tape T to run at the speed of $V_2$ ($\frac{2}{3} \cdot V_1$), the Fs indication code generator 9 to output the Fs indication code "1", and the clock pulse generator 8 to output 32 KHz sampling frequency. As a result, the Fs indication code adding circuit 5 adds "1" to the last bit of the control word A' in each frame of the digital signals so that the signals are recorded on the magnetic tape T in the pattern as shown in FIG. 3.

Reproducing mode:

The reproducing mode can be set by turning OFF the mode select switches 20 and 21 and ON the mode select switch 22.

When the reproducing mode is selected, the magnetic tape T starts running at the speed $V_1$ or $V_2$ controlled by the motor driving circuit 10 depending upon the initial setting by the control circuit 11. The reproducing head 7p picks up the digital data recorded on the magnetic tape T and outputs the data through the mode select switch 22 to the preamplifier 15 as digital signals.

From the preamplifier 15, the digital signals are introduced to the decoding circuit 16 where data reproduction and error correction are conducted.

Figure 4:
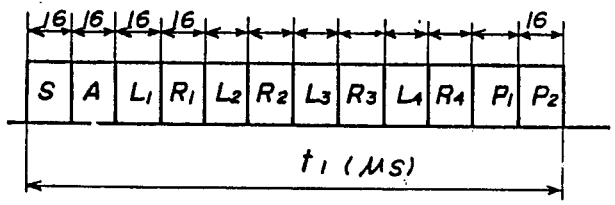
FIG. 4 shows the pattern of the reproduced digital signal which has been recorded at 48 KHz.

The digital signal pattern in one frame of the magnetic tape T does not change even if the digital signals have been recorded at different sampling frequencies, as indicated in FIGS. 2 and 3. Accordingly, when the magnetic tape T runs at the speed of, for example, $V_1$ for reproduction, the digital data is reproduced in such a form that one frame fits in the length $t_1$ irrespective of the Fs, as shown in FIG. 4. Therefore, the content of the digital signal can be read by the decoding circuit 16 which has been set in accordance with the above format. The lowest bit of the control word A (A') of the thus read signal is then determined by the Fs indication code determination circuit 19. If the lowest bit is "1", the control circuit 11 controls the motor driving circuit 10 to effect the magnetic tape T to run at the speed of $V_2$. The signals from the decoding circuit 16 are partly introduced into the D/A converter 18 and partly into the clock pulse regenerator 17 that regenerates clock pulses (equivalent to Fs) to control the D/A converter 18. Since the clock pulses are regenerated from the signals reproduced from the magnetic tape, analog signals will be reproduced automatically at the same sampling frequency as in recording, if the magnetic tape running speed is set in compliance with the Fs determined by the Fs indication code determination circuit 19.

According to the present invention as set forth above, a sampling frequency indication code is added to a digital signal when recorded on the magnetic tape and the magnetic tape is controlled to run at the speed in accordance with the selected sampling frequency. It will be appreciated, therefore, that the PCM recording and reproducing apparatus of the present invention can sample and record sound signals on the magnetic tape at any desired sampling frequency according to the requirement by another recording and reproducing apparatus.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A PCM recording and reproducing apparatus for recording a digital signal, obtained by sampling and quantizing analog signals, on a recording medium after adding a control word and a synchronizing signal to said digital signal in a signal processing circuit, said apparatus comprising:
- sampling frequency setting means for selecting a sampling frequency,
- control means for controlling the speed of recording said digital signal on said recording medium to correspond with the sampling frequency set by said sampling frequency setting means,
- sampling frequency indication code generating means for generating a sampling frequency indication code representative of said sampling frequency, and
- means for adding said sampling frequency indication code to said digital signal.

2. A digital recording and reproducing apparatus for recording a pulse code modulated digital signal obtained by sampling and quantizing an analog signal, comprising:
- signal processing means for adding a control word and synchronizing signal to said digital signal;
- means for selecting a sampling frequency associated with said digital signal;
- sampling frequency code generating means, responsive to said means for selecting, for developing a code representative of said sampling frequency;
- means, responsive to said sampling frequency code generating means, for adding said code to said digital signal;
- recording means, operatively connected to said means for adding, for recording said digital signal on a recording medium.

3. The apparatus of claim 2 further comprising means for converting an analog signal into said digital signal including,
- means for periodically sampling said analog signal with said sampling frequency, and
- means, responsive to said means for sampling, for converting said sampled analog signal into a plurality of digital words which collectively form said digital signal.

4. The apparatus of claim 2 further comprising:
- means for reading said recording medium to recover said digital signal; and
- means for decoding and converting said digital signal to recover said analog signal, said means for decoding and converting further detecting said sampling frequency code and using said code to control the conversion of said digital signal into said analog signal.

5. The apparatus of claim 2 wherein said digital signal includes a plurality of digital words.

6. The apparatus of claim 5 wherein said recording medium is a magnetic tape;
- said recording means including a recording head operatively communicating with said tape;
- said means for reading including a reading head operatively communicating with said tape;
- said apparatus further comprising:
- tape drive means for driving said tape past said recording head and said reading head at a selected tape drive speed, said tape drive means controlling said tape drive speed to record each said digital word on and read each said digital word from a preselected length of tape regardless of sampling frequency.

7. The apparatus of claim 2 wherein said recording medium is a magnetic tape;
- said recording means including a recording head operatively communicating with said tape;
- said apparatus further comprising:
- tape drive means for driving said tape past said recording head at a selected tape drive speed, said tape drive means controlling said tape drive speed to record each said digital word on a preselected length of tape regardless of sampling frequency.

* * * * *